US006963988B2

(12) United States Patent
Luick

(10) Patent No.: US 6,963,988 B2
(45) Date of Patent: Nov. 8, 2005

(54) FIXED POINT UNIT POWER REDUCTION MECHANISM FOR SUPERSCALAR LOOP EXECUTION

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 10/184,413

(22) Filed: Jun. 27, 2002

(65) Prior Publication Data

US 2004/0003308 A1 Jan. 1, 2004

(51) Int. Cl.$^7$ .............................................. G06F 1/30
(52) U.S. Cl. ...................................................... 713/324
(58) Field of Search ............................... 713/300, 320, 713/324

(56) References Cited

U.S. PATENT DOCUMENTS

| | | | | | |
|---|---|---|---|---|---|
| 4,398,245 | A | * | 8/1983 | Fujita | 711/214 |
| 5,138,703 | A | * | 8/1992 | Igarashi | 710/306 |
| 5,357,618 | A | * | 10/1994 | Mirza et al. | 711/3 |
| 5,870,574 | A | * | 2/1999 | Kowalczyk et al. | 712/206 |
| 6,138,223 | A | * | 10/2000 | Check et al. | 711/204 |
| 6,678,789 | B2 | * | 1/2004 | Shibayama | 711/117 |
| 6,678,815 | B1 | * | 1/2004 | Mathews et al. | 713/320 |
| 6,757,817 | B1 | * | 6/2004 | Booth | 712/241 |

* cited by examiner

*Primary Examiner*—Chun Cao
*Assistant Examiner*—Vincent Tran
(74) *Attorney, Agent, or Firm*—Bockhop & Associates LLC

(57) ABSTRACT

A system and methods for reducing power consumption in a computing device during the execution of a tight loop. When a tight loop is being executed, the data cache, the directory look up unit, and the address translation unit are disabled until a carry-out detector indicates that a new cache line needs to be fetched from the data cache.

8 Claims, 6 Drawing Sheets

| DW0 x4 | 1 | 2 | 3 | 4 | 5 | 6 | 7 |
|---|---|---|---|---|---|---|---|
| 8 | 9 | 10 | 11 | 12 | 13 | 14 | DW15 x4 |

200

PRIOR ART

Fig. 2

FIXED POINT UNIT POWER REDUCTION MECHANISM FOR SUPERSCALAR LOOP EXECUTION

BACKGROUND OF THE INVENTION

1. Field of the Invention

The present invention relates to computer hardware and more specifically relates to power consumption in a microchip.

2. Description of the Prior Art

As computer speed and computational power increase with advancing technologies, computing devices-consume more power and emit more heat. This power problem is especially apparent in general purpose computers, where the computer architecture is designed to solve generic problems. General purpose superscalar computers typically are optimized to assume random instruction sequences that can contain uncorrelated and non-repetitive instructions that load and store from one cycle to the next, where each cycle requires unique address translations and cache directory searches.

A general purpose computer architecture, such as a reduced instruction set computer (RISC), designed to solve generic problems performs its functions well. However, it does not consume power efficiently. For example, in a RISC-based computer, during the execution of special scientific applications that involve tight loops, many components in the computer are not actively used, but nevertheless consume power and emit heat.

One example of a tight loop is when a central processing unit (CPU) has all the instructions in the loop in its internal registers and does not need to fetch any additional instructions, and the CPU needs only to fetch operands for it to operate on.

One example of a primary problem in scientific computing involves long execution of tight loops such as a DAXBY floating point multiply add loop. In such an operation, the utilization of all units required is very near 100% for long periods (milliseconds). The heat generated can be greater than can be absorbed by the thermal constant of a silicon chip.

An example of DAXBY 100 is illustrated in FIG. 1. The example illustrates a tight loop of five instructions:

LFDU—Load Float Double with Update (operand 1)
LFDU'—Load Float Double with Update (operand 2)
FMADD—Float Multiply Add
STFDU—Store Float Double with Update
BC—Branch Conditional In a RISC-based computer, when this loop is executed, instructions are fetched from an instruction cache (Icache) and operands are fetched from a data cache (Dcache). The address of operands is stored in a register during the execution cycle and the result of calculation is stored in a register. The result in the register is read a few cycles later and sent to the Dcache, from where it is written back to the memory. The registers are mostly used for timing purposes during the execution cycle and separate memory access from the actual computation.

The clock gating of unused components, such as effective address generation and register file reads and writes, is of no value for the loop case, as all function is required every cycle.

Peak Dcache power can be avoided by banking the cache into 16 or more double-wide (DW) interleaved banks (4 KB each for a 64 KB L1 Dcache) as shown in FIG. 2. Such arrangement reduces Dcache power at 100% load and 100% store utilization by a factor of 16, because only the bank containing the required data is read or written.

However, for functional units in a tight loop case, where there is almost 100% of utilization of all units, the power and power density can be too high and would greatly limit the operating frequency of the processor core. The excessive power consumption and heating cause a severe cooling and reliability problem.

Therefore, there is a need for a system to reduce power consumption for loop codes.

SUMMARY OF THE INVENTION

In one aspect, the invention is a system for reducing power consumption in a computing device when the computing device executes instructions in a tight loop. The computing device includes a data cache, a data latch that latches data from the data cache, a table look up buffer, and an effective address translation unit. An address generation unit generates an address for an operand. The address is used by the table look up buffer and the effective address translation unit to retrieve the operand. A first carry-out detecting unit detects a first carry-out condition in a first preselected bit in the address generation unit. A first logic circuit causes new data to be retrieved from the data cache and latched into the data latch when the first carry-out detecting unit detects the first carry-out condition from the first preselected bit. A second logic circuit causes the operand to be obtained from the data latch without accessing the data cache, thereby reducing power consumed by the data cache when the first carry-out detecting unit does not detect the first carry-out condition from the first preselected bit.

In another aspect, the invention is a method for reducing power consumption in a computing device by selectively enabling a first preselected unit when the computing device executes instructions in a tight loop. The method detects when the computing device is in a tight loop. A first carry-out condition from a first preselected bit in an address generation unit is detected. A first signal from a first carry-out detecting unit is generated and is sent to the first preselected unit. If the first signal indicates the first carry-out condition, enabling the first preselected unit is enabled. If the first signal does not indicate the first carry-out condition, then the first preselected unit is disabled, thereby reducing power consumed by the first preselected unit.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 2 is a diagram of a prior art DW interleaved memory banks.

DETAILED DESCRIPTION OF THE INVENTION

Figure 1:
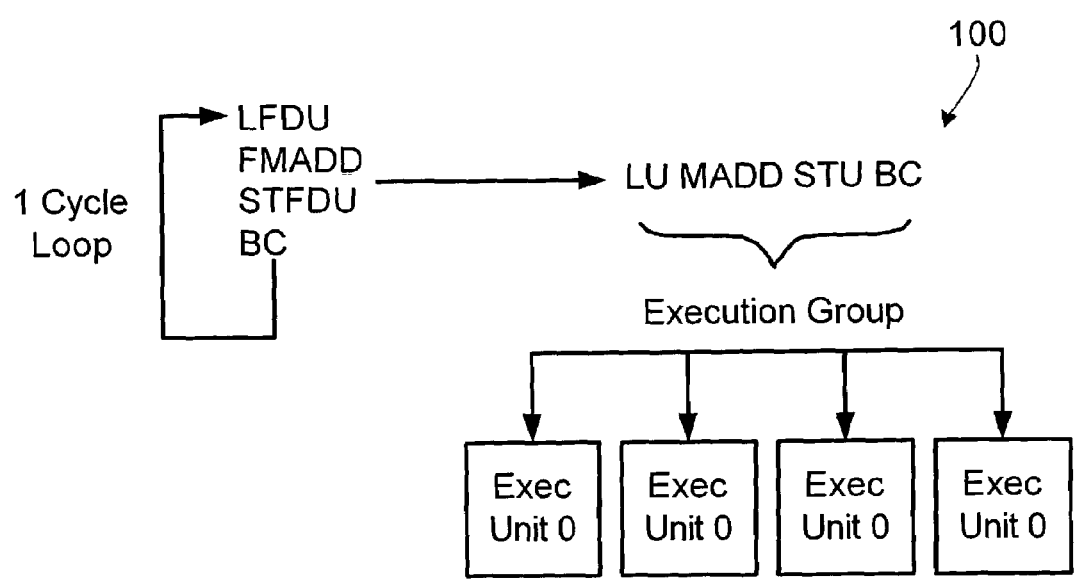
FIG. 1 is an illustration of a prior art tight loop with four floating point instructions.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

In a tight loop, such as a scientific loop, the processor strides through a memory or a cache array in a stride 1 situation, wherein one operand directly follows another. Each operand in floating point calculations is typically four bytes long or eight bytes long, and eight byte operands are more dominant. For example, in a cache line of 128 bytes, there are sixteen operands of eight bytes per each cache line. For floating point calculations in the stride 1 situation, one operand is eight bytes away from the next one, and an address register is incremented accordingly for each access.

The invention includes a system for reducing address translation for obtaining operands in a tight loop computation. When the system is in a tight loop computation, there is no need for fetching instructions from the Icache, and only the operands needs to be fetched.

Figure 3:
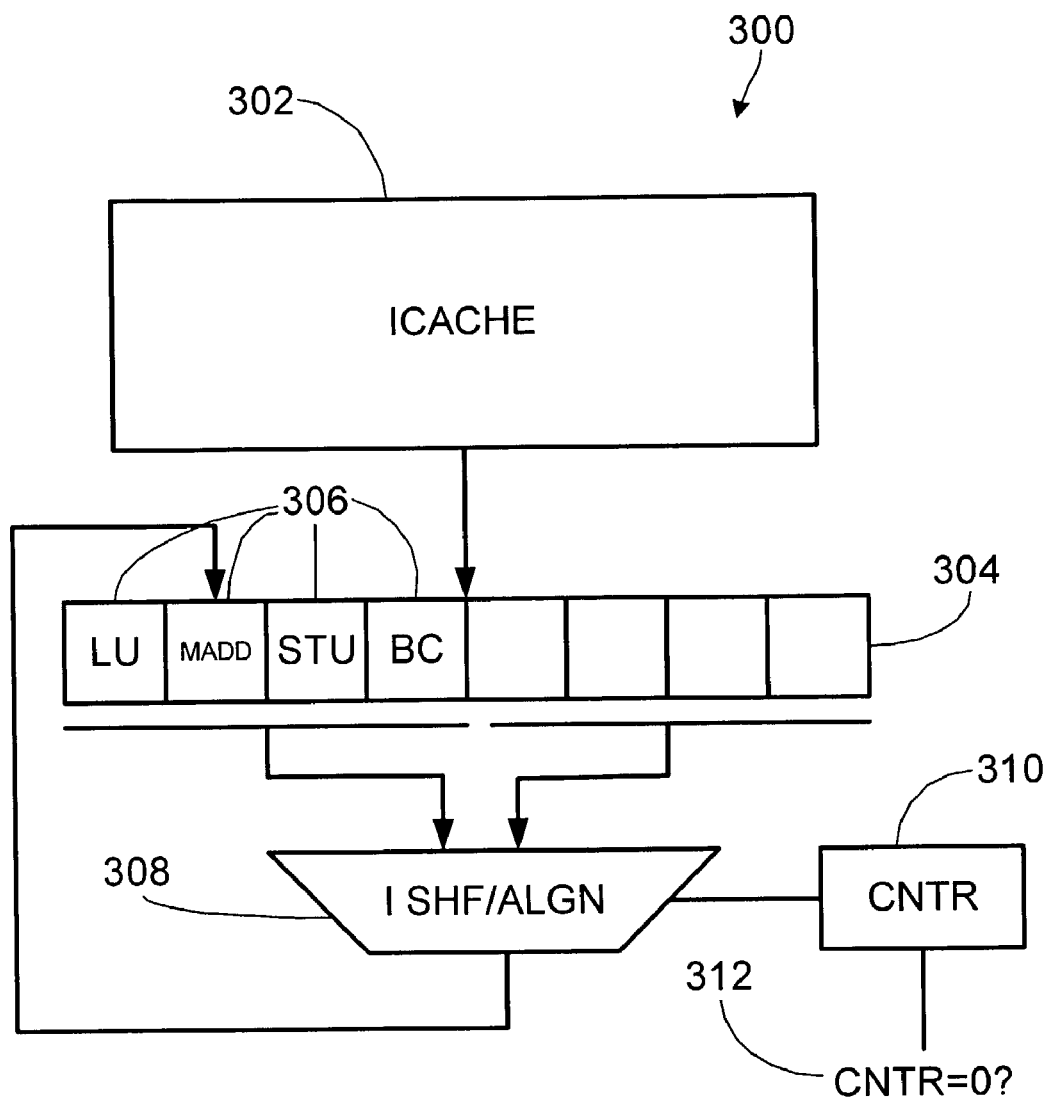
FIG. 3 is a schematic diagram of tight loop computation with all instructions in a single cache line.

FIG. 3 shows an arrangement 300 of general operations of a tight loop computation. When in the tight loop, the instructions are loaded from the Icache 302 to a register 304, where the instructions 306 are loaded and executed sequentially by an arithmetic-logic unit (ALU) 308. The ALU executes the instructions 306 repeatedly until a counter 310 gives the indication of count has reached zero 312, which indicates that the end of the loop has been reached.

The load with update (LU) instruction typically loads an operand from the Dcache into a register and increments the address register by eight bytes for the next operand. Similarly, the store with update (STU) instruction stores the result into the Dcache and increments the address register. Given that the system recognizes it is in a stride 1 tight loop situation, the system knows that the next operand is one stride away from the current operand. Therefore, the system avoids reading the address register, incrementing it by stride 1, and storing it back by incrementing a temporary register that has the address.

Figure 4:
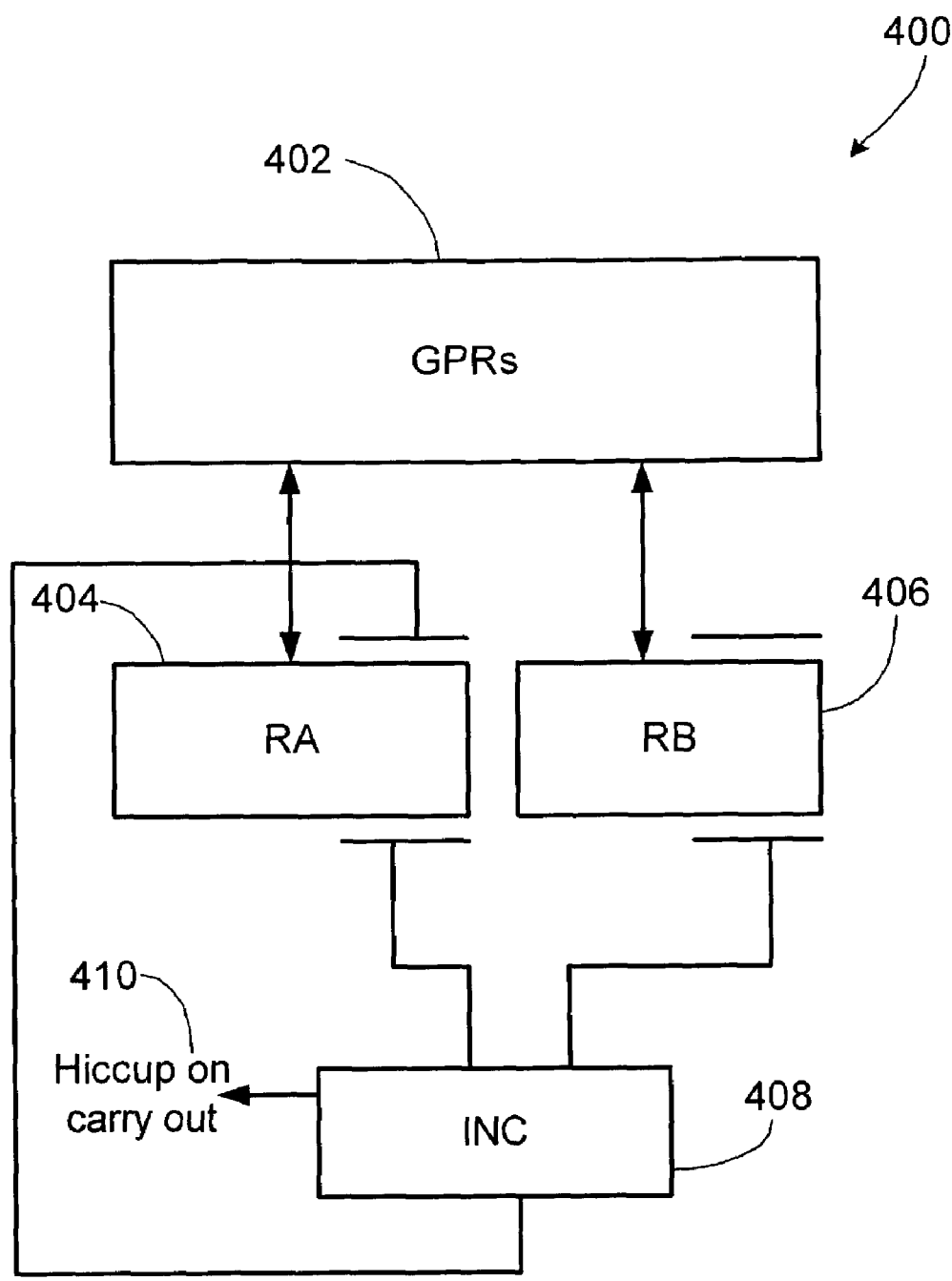
FIG. 4 is a schematic diagram of an update increment circuit according to one embodiment of the invention.

For repeated operations of LUs and STUs, wherein known values of registers are loaded, updated, and stored repeatedly, access to general purposes registers can be minimized through a circuit 400 according to FIG. 4. The initial value is loaded into a base register (RA) 404 and the increment value is loaded into an index register (RB) 406. The RA and RB are loaded once at the beginning of the loop. The results from the increment (RA+RB) are kept in a pipeline register TRA (not shown) internal to the incrementer 408, and the increment or stride value is kept in another pipeline register TRB (not shown) also internal to the incrementer 408 for the entire loop. At the end of the loop, the result is written back into the base register 404, from where it is stored back into the GPRs 402. No GPRs are read or written for the LU and STU during the loop execution.

FIG. 4 illustrates address generation for a load with update (LU) and store with update (STU) instructions. The base address register 404 and the index register 406 are loaded from the general purpose registers (GPRs) 402 at the beginning of the loop on iteration 1. The final updated address is written back to the GPRs 402 only at the last loop iteration. The results from the increment (RA+RB) are kept in a pipeline register TRA (not shown), and the increment or stride value is kept in another pipeline register TRB (not shown) for the entire loop. No GPRs are read or written for the LU and STU during loop execution.

For a loop with back to back LU instructions, there is a strong likelihood of the next operand is in the same page and in the same cache line. Depending on the size of operands, a single cache line may be accessed 16 times and there is no need for Dcache directory access while the data can be found in the current cache line. Similarly, a page may be accessed 512 times and there is no need for address translation while the same page is being accessed. Thus, the update read and write of RA into the register file also need occur only once in 512 iterations of the loop.

Figure 5:
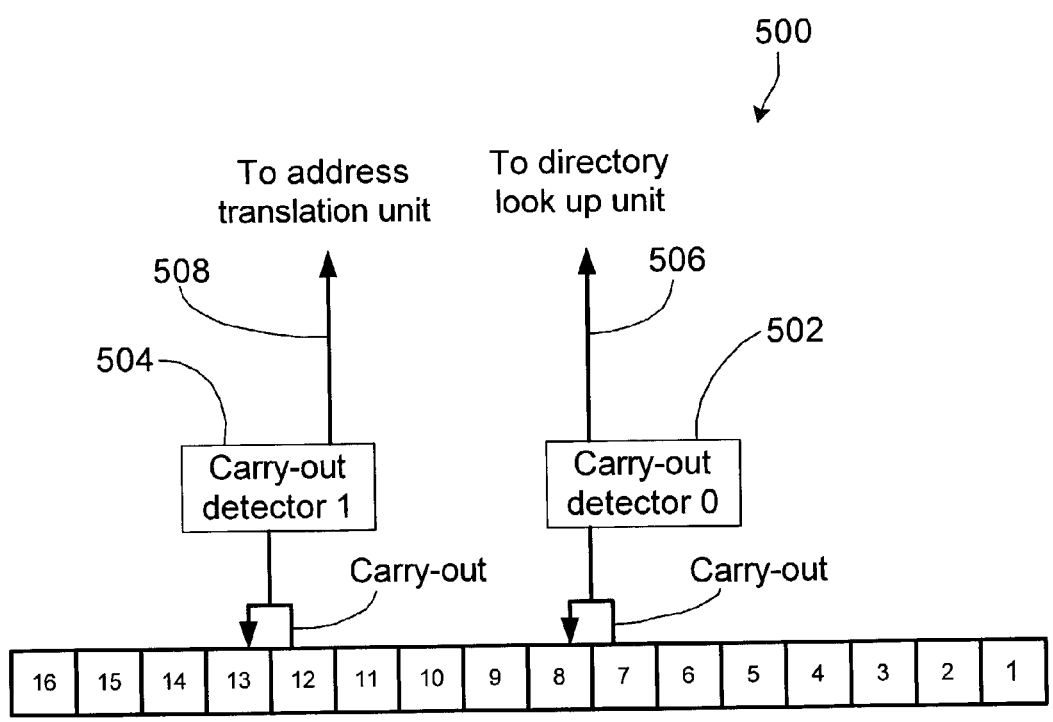
FIG. 5 is a schematic diagram of a carry-out indicator according to one embodiment of the invention.

FIG. 5 illustrates carry-out indicators in lower 16 bits of an address register in an address generation unit (not shown) according to one embodiment of the invention. The address is used for fetching operands for a tight loop computation. For a cache line of 128 bytes, there is no need for fetching a next data from the Dcache until the carry-out detector 502 detects a carry-out from the $7^{th}$ bit, and for a page with 4 KB data, there is no need for address translation until the carry-out detector 504 detects a carry-out from the $12^{th}$ bit.

While there is no carry-out from the $7^{th}$ bit, the carry-out detector 502 sends a signal 506 to a directory look up unit and disabling it. Without a carry-out from the $12^{th}$ bit, the carry-out detector 504 sends a signal 508 to an address translation unit, and no address translation will be performed. By avoiding unnecessary Dcache access, directory look ups, and address translations, power is saved.

Figure 6:
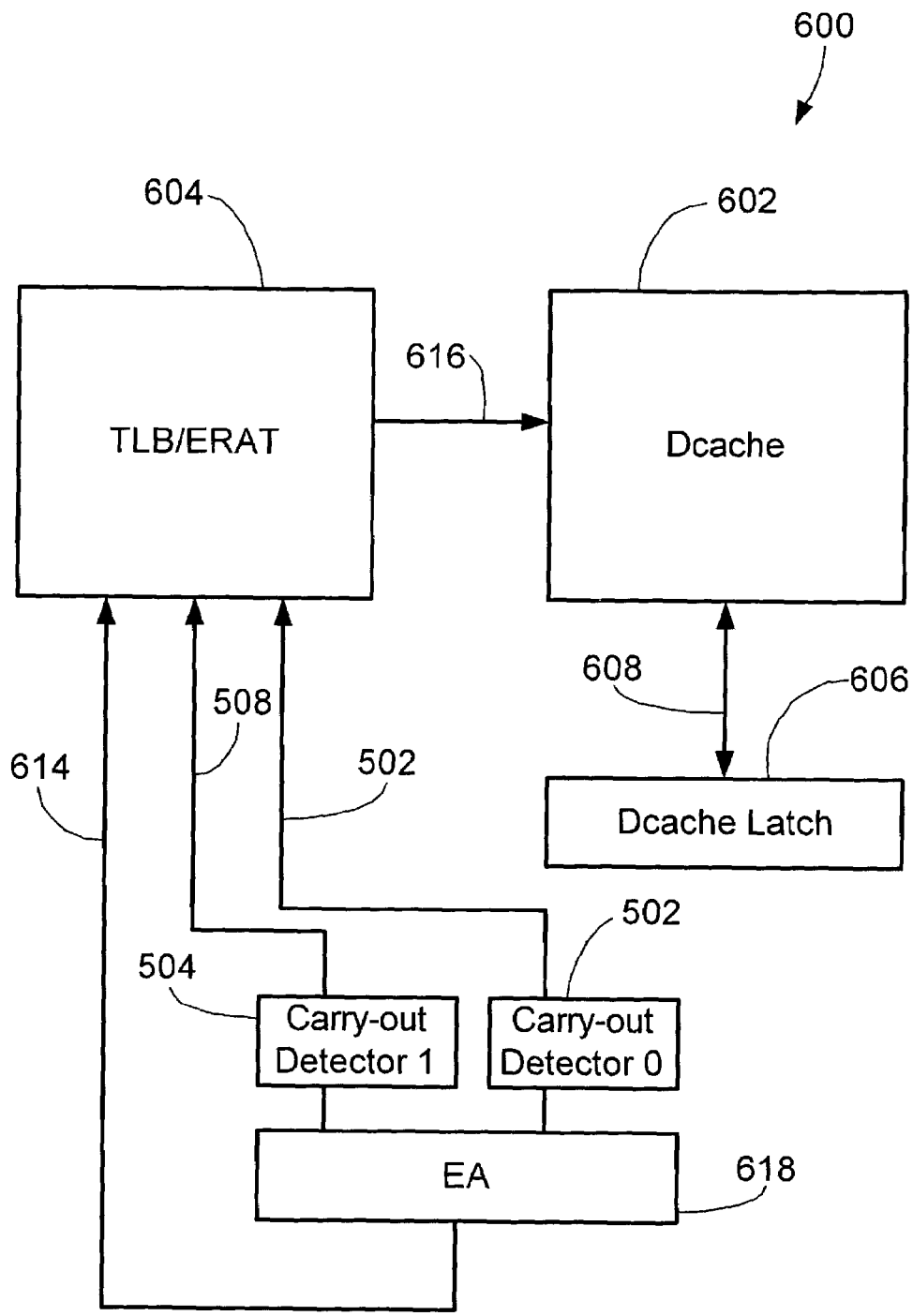
FIG. 6 is a schematic diagram of a Dcache access circuit according to one embodiment of the invention.

FIG. 6 illustrates a circuit 600 for Dcache 602 access. The Dcache 602 outputs data onto a data bus 608 and the data are latched in a by a register or a latch 606 for use by a calculating unit (not shown). The address of the data (operand) is from the address generation unit (not shown) and the address is latched by the address register 618. Two carry-out detecting units 502, 504 are connected to the address register 618. One carry-out detecting unit 502 monitors the carry-out condition on the 7th bit and another carry-out detecting unit 504 monitors the carry-out condition on the 12th bit.

The address register 618 is connected to the TLB/ERAT 604, where the address is used to for directory look up and effective address translation. The TLB/ERAT 604 provides the translated address to the Dcache 602 through an address bus 616 and the proper data is retrieved from the Dcache 602. The TLB/ERAT 604 can be selectively disabled to reduce power consumption. The operations for directory look up or effective address translation are only needed if the carry-out detecting units 502, 504 detect carry-out conditions as explained above. The carry-out conditions are provided to the TLB/ERAT 604 through signal paths 610, 612.

When the carry-out detecting unit 502 does not detect the carry-out condition from the 7th bit, the next operand is obtained from the Dcache latch 606. When the carry-out detecting unit 502 detects the carry-out from the 7th bit, the address from the address register 618 is used for directory look up and a new data from Dcache 602 is loaded into the Dcache latch 606.

If the carry-out detecting unit 504 detects the carry-out condition on the twelfth bit, then an effective address translation is performed by the TLB/ERAT 604 before a data is retrieved from the Dcache 602.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A system for reducing power consumption in a computing device when the computing device executes instructions in a tight loop, the computing device including a data cache, a data latch that latches data from the data cache, a table look up buffer, and an effective address translation unit, the system comprising:
    an address generation unit that generates an address for an operand, the address being used by the table look up buffer and the effective address translation unit to retrieve the operand;
    a first carry-out detecting unit that detects a first carry-out condition in a first preselected bit in the address generation unit, the first carry-out condition indicating that a tight loop computation has completed and an absence of the first carry-out condition indicating that the tight loop computation has not completed;
    a first logic circuit that causes new data to be retrieved from the data cache and latched into the data latch when the first carry-out detecting unit detects the first carry-out condition from the first preselected bit; and
    a second logic circuit that sends a signal to the effective address translation unit that causes the operand to be obtained from the data latch and that prevents performance of an address translation and a data cache access when the first carry-out detecting unit does not detect the first carry-out condition from the first preselected bit thereby reducing power consumed by the data cache.

2. The system of claim 1, wherein the first preselected bit is the seventh bit, and when the first carry-out condition has not being detected, the table look up buffer is not accessed, thereby reducing power consumed by the table look up buffer.

3. The system of claim 1, wherein the first preselected bit is the twelfth bit, and when the first carry-out condition has not being detected, the effective address generation unit is not accessed, thus reducing power consumed by the effective address generation unit.

4. The system of claim 1 further comprising a second carry-out detector for detecting a second carry-out condition in a second preselected bit in the effective address generation unit.

5. A method for reducing power consumption in a computing device by selectively enabling a first preselected unit when the computing device executes instructions in a tight loop, the method comprising the steps of:
    detecting when the computing device is in a tight loop;
    detecting a first carry-out condition from a first preselected bit in an address generation unit, the first carry-out condition indicating that a tight loop computation has completed and an absence of the first carry-out condition indicating that the tight loop computation has not completed;
    generating a first signal from a first carry-out detecting unit;
    sending the first signal to the first preselected unit;
    if the first signal indicates the first carry-out condition, then enabling the first preselected unit; and
    causing the operand to be obtained from a data latch and preventing performance of an address translation and a data cache access when the first carry-out detecting unit does not detect the first carry-out condition from the first preselected bit and causing an operand to be obtained from the data latch without accessing the data cache, thereby reducing power consumed by the data cache.

6. The method of claim 5, wherein the first preselected bit is a seventh bit and the first preselected unit is a directory look up unit.

7. The method of claim 5, wherein the first preselected bit is a twelfth bit and the first preselected unit is an address translation unit.

8. The method of claim 5, further comprising the steps of:
    detecting a second carry-out condition from a second preselected bit in an address generation unit;
    generating a second signal from a second carry-out detecting unit;
    sending the second signal to a second preselected unit;
    if the second signal indicates the second carry-out condition, then enabling the second preselected unit; and
    if the second signal does not indicate the second carry-out condition, then disabling the second preselected unit thus reducing power consumed by the second preselected unit.

* * * * *